United States Patent [19]
Härle

[11] Patent Number: 5,259,715
[45] Date of Patent: Nov. 9, 1993

[54] SELF-LOCKING THREADED CONNECTION

[76] Inventor: Anton Härle, Drechslerweg 40, W-4400 Münster-Roxel, Fed. Rep. of Germany

[21] Appl. No.: 735,435

[22] Filed: Jul. 25, 1991

[51] Int. Cl.$^5$ .......................................... F16B 39/30
[52] U.S. Cl. .................... 411/311; 411/929; 411/427
[58] Field of Search ............ 411/144, 147, 149, 305, 411/309, 310, 311, 259, 411, 929, 366, 427

[56] References Cited

U.S. PATENT DOCUMENTS

| | | | |
|---|---|---|---|
| 1,064,699 | 6/1913 | Berns et al. | 411/166 X |
| 1,111,382 | 9/1914 | Hibbard | 411/167 |
| 1,420,725 | 6/1922 | Mattson | 411/956 X |
| 2,246,652 | 6/1941 | Wingard | 411/378 X |
| 2,962,317 | 11/1960 | Morse | 411/166 X |
| 3,176,359 | 4/1965 | Ward | 411/366 |
| 3,266,363 | 8/1966 | Bronson et al. | 411/938 X |
| 3,295,580 | 1/1967 | Waltermire | 411/959 X |
| 3,823,526 | 7/1974 | Rose | 411/959 |
| 3,850,215 | 11/1974 | Orlomoski | 411/311 |
| 3,927,503 | 12/1975 | Wilson | 411/938 X |
| 4,043,369 | 8/1977 | Abernethy | 411/277 |
| 4,171,012 | 10/1979 | Holmes | 411/928 X |
| 4,432,682 | 2/1984 | McKewan | 411/311 |
| 4,586,861 | 5/1986 | McKewan | 411/311 |
| 4,741,654 | 5/1988 | Lovisek | 411/959 X |
| 4,810,149 | 3/1989 | Lee et al. | 411/411 |
| 4,850,775 | 7/1989 | Lee et al. | 411/411 X |
| 4,983,084 | 1/1991 | Gray | 411/311 |

FOREIGN PATENT DOCUMENTS

| | | | |
|---|---|---|---|
| 2645519 | 4/1977 | Fed. Rep. of Germany . | |
| 2903845 | 8/1979 | Fed. Rep. of Germany . | |
| 1508746 | 1/1968 | France | 411/378 |
| 731857 | 6/1955 | United Kingdom | 411/171 |
| 760297 | 10/1956 | United Kingdom | 411/167 |
| 8911044 | 11/1989 | World Int. Prop. O. | 411/311 |

*Primary Examiner*—Rodney M. Lindsey
*Attorney, Agent, or Firm*—Peter K. Kontler

[57] ABSTRACT

A self-locking connection between the external thread of a bolt and the internal thread of a nut is established by providing at least one face of the internal and/or external thread with a self-locking portion which is adjacent the root of the respective thread. The self-locking portion has a first facet which makes with the central axis of the respective thread an angle of between 5° and 30°, preferably an angle of between 8° and 15°, and at least one additional facet which is adjacent the first facet and is inclined relative to the central axis at a greater second angle. The self-locking action is established in that the crest of the other thread is urged toward and is deformed against the self-locking portion of the at least one face in response to adequate axial stressing of the nut and/or the bolt. The polygonal peripheral surface of the nut has an odd number of sections not a single one of which is parallel to any other section. The radially outer portion of the nut can be made of a material which is less elastic than the material of the radially inner portion so that the nut can oppose substantial radial expanding forces which develop on establishment of the self-locking action.

14 Claims, 3 Drawing Sheets

FIG. 8
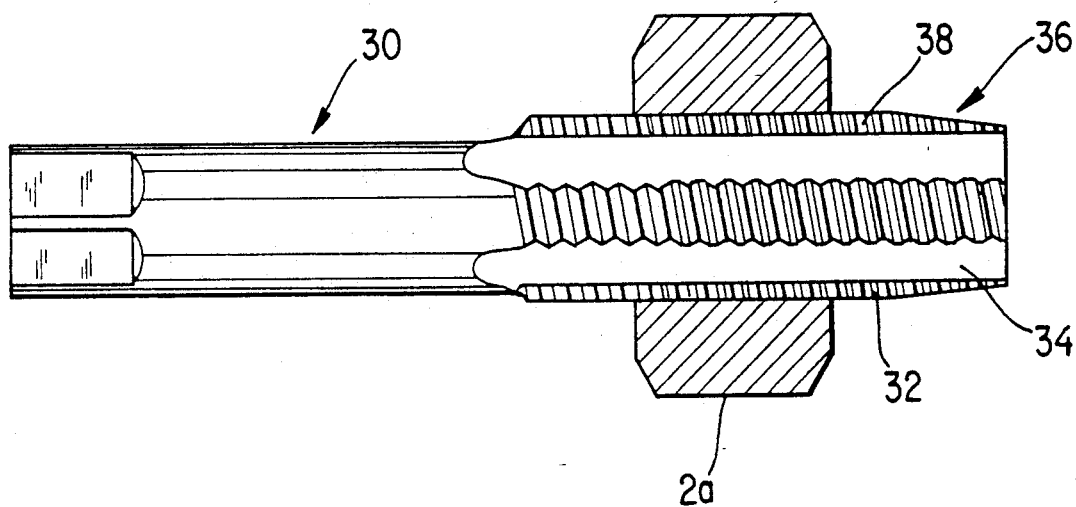
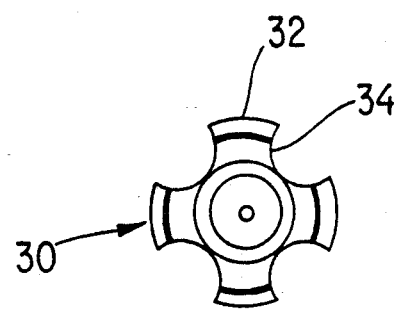
FIG. 9

SELF-LOCKING THREADED CONNECTION

CROSS-REFERENCE TO RELATED CASE

The threaded connection of the present invention constitutes an improvement over and a further development of the connection which is described and shown in commonly owned copending patent application Ser. No. 07/652,553 filed Feb. 7, 1991.

BACKGROUND OF THE INVENTION

The invention elates to self-locking threaded connections of the general character described in the commonly owned copending patent application Ser. No. 07/652,553. Typical examples of threaded connections to which the present invention pertains are those between a spindle, bolt or screw and a single nut, or between a spindle, bolt or screw and a first nut as well as a second or lock nut.

German Pat. No. 26 45 519 to Holmes discloses a self-locking threaded connection wherein the roots of the internal and external threads are provided with ramps which can be engaged by the crests of the external and internal threads, respectively, to establish a self-locking connection in response to axial stressing of the male and/or female component of the threaded connection. The ramps are inclined relative to the central axes of the respective threads at an angle of between 15° and 45°, preferably 20° to 35°. A drawback of the patented connection is that a self-locking action can be achieved in one direction only. On the other hand, it is often desirable to establish a self-locking connection which is effective in both axial directions. Another drawback of the patented proposal is that unidirectional self-locking action can be achieved only in response to extensive axial stressing (and accompanying displacement) of at least one of the mating parts.

U.S. Pat. No. 4,586,861 to McKewan discloses a threaded connection wherein the ramp at the root of one of the threads has a convex shape. The purpose of the convex ramp is to enhance the resistance against vibrations. A drawback of this patented connection is that, once deformed, the crest of the thread which engages the ramp can slide in a direction toward the deepmost portion of the root of the other thread.

Published German patent application No. 29 03 845 of Holmes discloses a threaded connection wherein the inclination of the faces on the external thread departs from the inclination of the adjacent faces on the internal thread. In addition, the root of the internal thread is provided with a flat, and the maximum diameter of certain portions of the root of the internal thread is less than the maximum diameter of a portion of the crest of the external thread. The purpose of the threaded connection of Holmes is to reduce the likelihood of loosening in response to vibration.

The self-locking action of mating external and internal threads is attributable to elastic deformation of abutting faces of the two threads. The locking action remains intact as long as the abutting faces are urged against each other as a result of axial stressing of the male and/or female component.

OBJECTS OF THE INVENTION

An object of the invention is to provide a novel and improved self-locking threaded connection which is more reliable than heretofore known self-locking connections.

Another object of the invention is to provide a connection which can compensate for tolerances in the rolling, machining or any other mode of making the external and/or internal threads.

A further object of the invention is to provide a novel and improved externally threaded component for use in the above outlined self-locking connection.

An additional object of the invention is to provide a novel and improved internally threaded component for use in the above outlined connection.

Still another object of the invention is to provide a novel and improved method of shaping the faces of external and/or internal threads of components which can be used for the establishment of a self-locking threaded connection.

A further object of the invention is to provide a novel and improved nut for use in a self-locking threaded connection.

Another object of the invention is to provide a novel and improved bolt or screw for use in a self-locking threaded connection.

SUMMARY OF THE INVENTION

One feature of the present invention resides in the provision of a self-locking threaded connection which comprises a male component (such as a screw or a bolt) having an external screw thread, and a female component (such as a nut) having an internal screw thread. Each of the two threads has a central axis, a root, a crest and two faces flanking the root and extending all the way to the crest. In accordance with a feature of the invention, at least one face of at least one of the threads includes a self-locking portion which is adjacent the respective root and has a plurality of mutually inclined facets. These facets include a first facet which is inclined relative to the respective axis at a first angle of between 5° and 30°, and at least one additional facet which is adjacent the first facet and is inclined relative to the respective axis at a second angle greater than the first angle. The aforementioned portion of the at least one face is engaged by one face of the other thread in response to sufficient axial stressing of at least one of the components to establish a self-locking connection between the engaged faces of the two threads.

The self-locking portion of the at least one face can be provided with three facets each of which is inclined at a different angle to the respective axis. The three facets can include the first facet and two additional facets which flank the first facet, i.e., the first facet can be disposed between the two additional facets.

The first angle can be in the range of between 8° and 15°, and the second angle can be in the range of 60°±20°.

The at least one additional facet or at least one of two additional facets or at least the first facet can be a substantially flat facet.

It is also possible to provide a self-locking portion wherein at least one of the facets has an arcuate (e.g., convex) cross-sectional outline.

Another feature of the invention resides in the provision of a self-locking threaded connection which comprises a male component (e.g., a bolt or a screw) having an external screw thread and a female component having an internal screw thread. Each thread has a central axis, a root, a crest and two faces flanking the root. At least one face of at least one of the two threads includes a self-locking portion which is adjacent the respective root and is inclined with reference to the respective central axis so that such portion of the at least one face is frictionally engaged by one face of the other thread in response to axial stressing of at least one of the two components. The female component 2a has a polygonal external surface (such polygonal surface can constitute the peripheral surface of a nut), and such polygonal surface includes a plurality of facets (hereinafter called sections to distinguish from the aforementioned facets of the self-locking portion of the at least one face) each of which is inclined relative to each other section. For example, the external surface can consist of three or five sections.

A further feature of the invention resides in the provision of a self-locking threaded connection which comprises a male component having an external screw thread and a female component having an internal screw thread. Each thread has a central axis, a root, a crest and two faces flanking the root. At least one face of at least one of the two threads includes a self-locking portion which is adjacent the respective root and is inclined with reference to the respective central axis so that such portion of the at least one face is engaged by one face of the other thread in response to axial stressing of at least one of the two components. The female component includes an inner portion which surrounds the internal thread and has a first elasticity and a first plasticity, and an outer portion which surrounds the inner portion and has a less pronounced second elasticity and a less pronounced second plasticity. Thus, the outer portion can be said to perform the function of a reinforcing envelope which prevents radial expansion of the inner portion in response to axial stressing of the at least one component.

An additional feature of the invention resides in the provision of a self-locking threaded connection which comprises a male component having an external screw thread and a female component having an internal screw thread. Each screw thread has a central axis, a root, a crest and two faces flanking the root. At least one face of at least one of the two threads includes a self-locking portion which is adjacent the respective root and is inclined with reference to the respective central axis so that such self-locking portion of the at least one face is engaged by one face of the other thread in response to axial stressing of at least one of the male and female components. The male component has a first surface (such first surface can constitute that surface on the head of a bolt or screw which is adjacent one end of the externally threaded shank) which extends substantially radially outwardly from the external thread, and the female component has a second surface confronting the first surface (the second surface can constitute one end face of a nut). At least one of these surfaces has a marginal portion which is more distant from the respective thread and an inner portion which is nearer to the respective thread and is spacedly surrounded by the marginal portion. The marginal portion and the inner portion of the at least one surface are offset relative to each other in the axial direction of the respective thread. The at least one surface can constitute a hollow frustoconical surface, a concave surface or an in part concave and in part conical surface.

Still another feature of the invention resides in the provision of a thread forming (e.g., thread cutting or thread rolling) tool which comprises means for making self-locking threaded connections of the above outlined character (see FIGS. 8 and 9).

The novel features which are considered as characteristic of the invention are set forth in particular in the appended claims. The improved threaded connection itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 8 is a partly side elevational and partly axial sectional view of a thread cutting tool which can be used for the making of a nut of the type shown in FIG. 1; and FIG. 9 is an end elevational view of the tool which is shown in FIG. 8.

DESCRIPTION OF PREFERRED EMBODIMENTS

Figure 1:
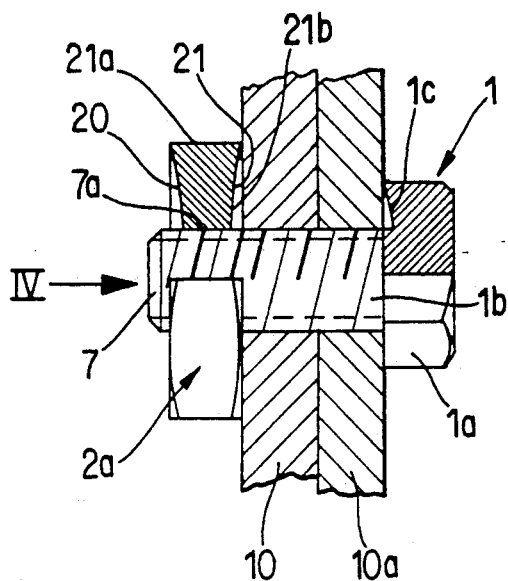
FIG. 1 is a schematic partly elevational and partly axial sectional view of a self-locking threaded connection which embodies one form of the invention.

FIG. 1 shows a self-locking threaded connection comprising a first (male) component 1 having an external thread 7, and a second (female) component 2a having an internal thread 7a. The male component 1 is a bolt having a head 1a and a shank 1b which latter is provided with the external thread 7, and the female component 2a is a nut. The nut 2a mates with the shank 1b of the bolt 1 to clamp two panels, plates, sheets or like parts 10, 10a between the substantially radially extending surface 1c of the head 1a and the substantially radially extending surface or end face 21 of the nut 2a. The head 1a is assumed to have a customary hexagonal cross-sectional outline, and the polygonal peripheral surface of the nut 2a has a triangular outline (FIG. 4) with three facets or sections 2b each of which is inclined with reference to each other section.

If the nut 2a is held against axial and angular movement while the bolt 1 is rotated to cause further penetration of the shank 1b into the nut, the distance of the surface 1c from the surface 21 is reduced and the parts 10, 10a are clamped against each other as well as against the surface 21 and surface 1c, respectively.

FIG. 1 shows that the marginal portion 21a of the surface or end face 21 is axially offset relative to the inner portion 21b of such surface. The illustrated surface 21 is a hollow conical surface. Such configuration of the surface 21 causes the marginal portion 21a to bear against the adjacent side of the part 10 and to actually penetrate into the part 10 if the latter is sufficiently elastic or otherwise deformable. The surface or end face 20 is a mirror image of the surface 21, and the surface 1c can be a mirror image of the surface 20 or 21. The illustrated surfaces 1c, 20, 21 (or at least one of these surfaces) can be replaced with concave surfaces or surface without departing from the spirit of the invention. The conicity of the surface 1c and/or 20 and/or 21 can be in the range of between 2° and 20°.

Figure 2:
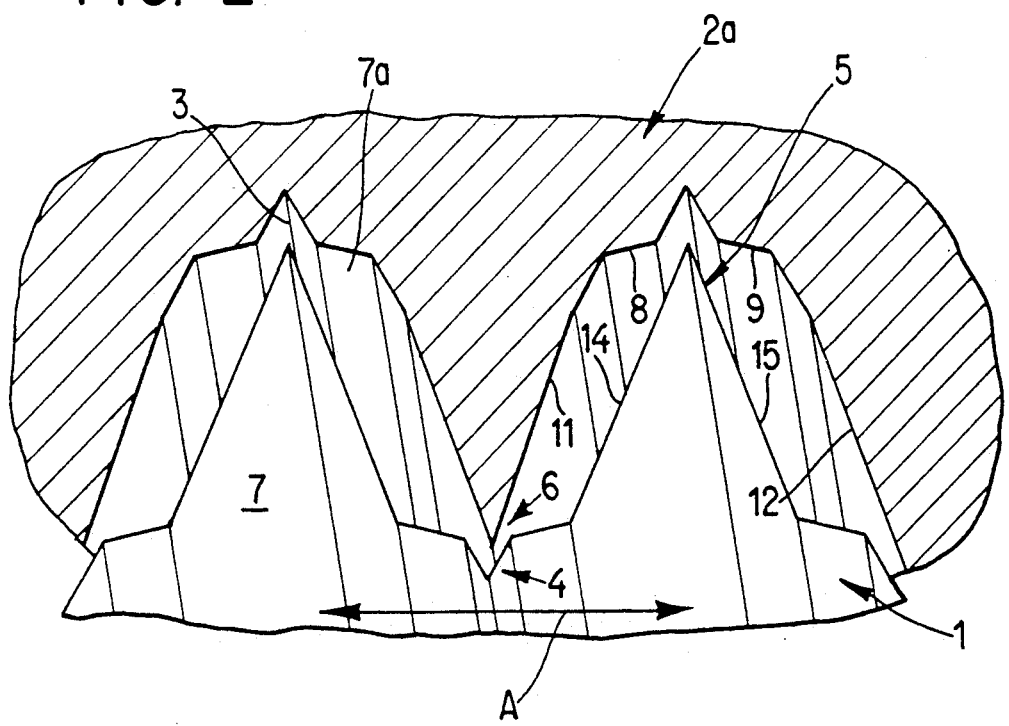
FIG. 2 is a greatly enlarged fragmentary axial sectional view of an internally threaded female component and a fragmentary elevational view of a mating male component of the improved self-locking threaded connection, the two components being shown in axial positions in which they are free running relative to each other.
Figure 3:
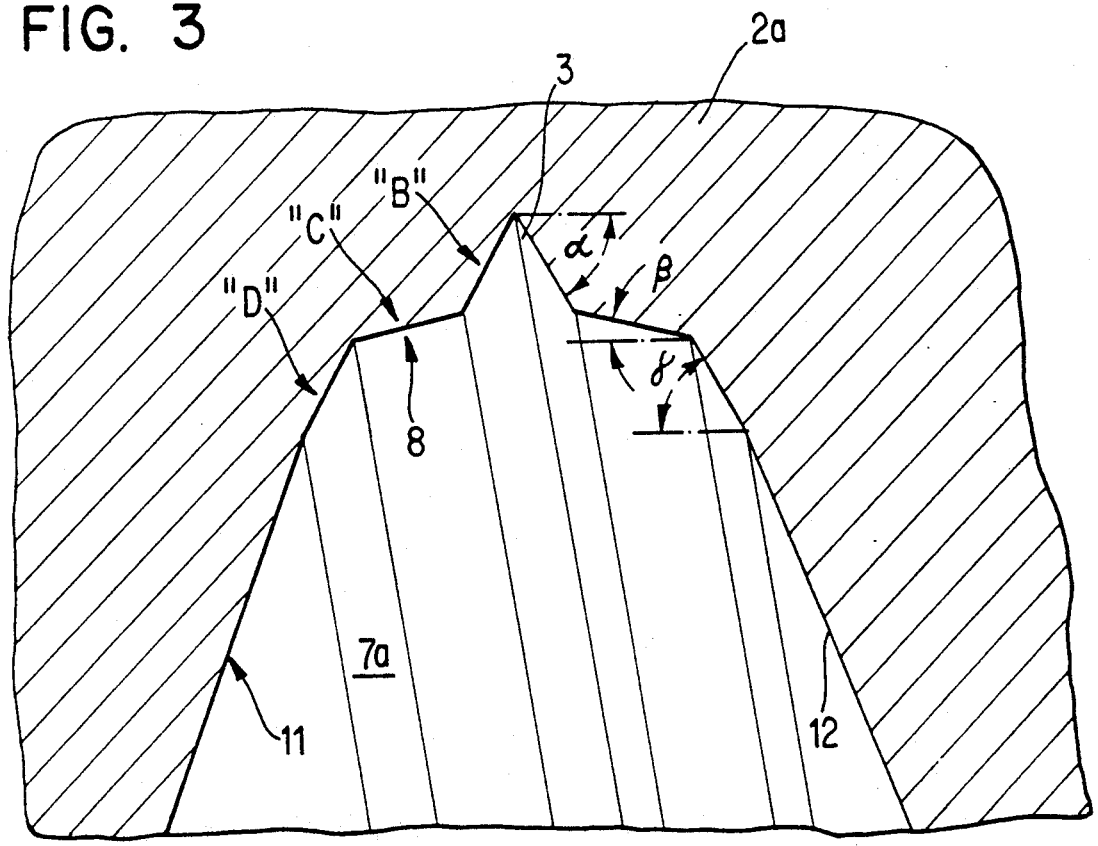
FIG. 3 is an enlarged view of a detail in FIG. 2, showing the root and the flanks of the internal thread.

The novel configuration of the external thread 7 and of the internal thread 7a is shown in greater detail in FIGS. 2 and 3. The thread 7 has a root 4, a crest 5 and two faces 14, 15 each of which extends between the root 4 and the crest 5. The thread 7a has a root 3, a crest 6 and two faces 11, 12 each of which extends between the root 3 and the crest 6. The reference character A denotes the central axes of the bolt 1 and nut 2a; such axes coincide when the thread 7 is in proper mesh with the thread 7a.

In accordance with a feature of the invention, at least one of the faces 11, 12, 14, 15 is configured in a manner to ensure the establishment of a superior self-locking action. FIG. 2 shows that each of the four faces 11, 12, 14, 15 is designed to permit the establishment of a self-locking engagement between the threads 7 and 7a; therefore, only the configuration of the faces 11, 12 will be described in detail with reference to FIG. 3. That (self-locking) portion 8, 9, respectively, of each of the faces 11, 12 which is adjacent the root 3 includes several mutually inclined sections or facets (hereinafter called facets) B, C and D. The facet C will be called a first facet and the facets B, D will be called additional or second facets. The remaining portions of the faces 11, 12 are but need not be at least substantially parallel to the major portions of the neighboring faces 14, 15, at least while the bolt 1 is free running relative to the nut 2a and/or vice versa.

The first facet C of each of the self-locking portions 8, 9 is flanked by (i.e., is disposed between) the additional facets B and D. The facet B is adjacent the root 3, and the facet D is adjacent the major portion of the respective face 11, 12.

The inclination of the facet C relative to the central axis A of the thread 7a is shown at beta; this angle can be in the range of between 5° and 30°, preferably 8° and 15°, most preferably 13°. The inclination of the facet B relative to the central axis A is shown at alpha; this angle can be in the range of 60°±20°. The inclination of the facet D relative to the central axis A is shown at gamma; this angle can but need not match or approximate the angle alpha, i.e., it is preferably in the range of 60°±20°. As a rule, or at least in many instances, the angle beta is smaller than the angle alpha or gamma.

The illustrated facets B, C and D are flat or straight, i.e., their cross-sectional outlines are or approximate straight lines. However, it is equally within the purview of the invention to provide the self-locking portion 8 and/or 9 with one or more facets having an arcuate (concave or convex) cross-sectional outline. For example, each facet B can have a convex and each facet D can have a concave cross-sectional outline. The utilization of concave facets D contributes to the ability of the improved self-locking threaded connection 1+2a to compensate for tolerances between the components 1 and 2a.

Optimal self-locking action is achieved when the major components of forces which urge the neighboring faces of the male and female threads against each other act in a direction at right angles to the central axes of the two components. Thus, and referring to FIG. 3, the facet C will be in an optimum position to ensure most satisfactory frictional engagement with the crest 5 of the external thread 7 if such facet extends in exact or substantial parallelism with the axis A. A certain small amount of inclination (angle beta) is necessary in order to account for elastic deformation of the crest 5. Moreover, a certain angle beta is necessary on the additional ground that the threaded connection must compensate for certain tolerances; a relatively large angle beta (e.g., an angle in the range of 13°) ensures that a self-locking action can take place between neighboring faces of internal and external threads even if the dimensions of the internal thread 7a are at the upper limit and the dimensions of the external thread 7 are at the lower limit of the acceptable range of dimensions.

The provision of self-locking portions 8 and 9 on the faces 11 and 12 ensures that the threaded connection can be self-locking in each of the two axial directions, i.e., in response to exertion of a pull upon the nut 2a in a direction away from the head 1a of the bolt 1 as well as in response to exertion of a push upon the nut toward the head of the bolt.

An important advantage of the improved self-locking threaded connection is that the problem of compensation for tolerances and of achieving a highly satisfactory self-locking action can be solved at one and the same time, i.e., merely by novel shaping of a relatively small self-locking portion of one or both faces of the internal and/or external thread. All that is necessary is to provide each such self-locking portion with at least two facets one of which has an inclination (relative to the respective central axis) which is more pronounced than that of the other. As described above, the inclination of the first or central facet C is less pronounced than that of the two additional facets B and D if the portion 8 of the face 11 and/or the portion 9 of the face 12 is provided with three facets.

The surfaces 1c, 20 and 21 exhibit the advantage that they initiate a pronounced axial stressing of the threaded connection as soon as their marginal portions (note the marginal portion 21a) are caused to engage the adjacent parts. Thus, and assuming that the bolt 1 of FIG. 1 is driven home to an extent which is necessary to move the marginal portion 21a against the adjacent side of the part 10, further rotation of the bolt 1 relative to the nut 2a and/or vice versa in a direction to move the nut nearer to the head 1a of the bolt will entail pronounced axial stressing of the mating threads 7, 7a with the establishment of desirable self-locking action between the faces 11, 14 or 12, 15. The nut 2a and/or the head 1a then acts not unlike a spring which applies a substantial restoring force and ensures the establishment and maintenance of a reliable self-locking action.

Figure 7:
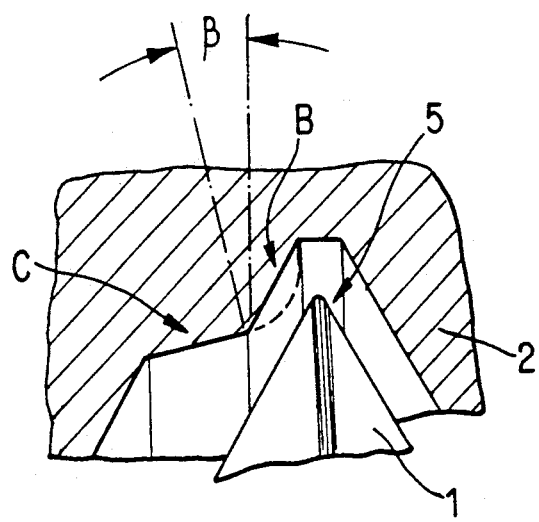
FIG. 7 is a fragmentary axial sectional view of a female component which constitutes a modification of the female component of FIGS. 2–3, and a fragmentary elevational view of the complementary male component.

FIG. 7 shows a modified self-locking threaded connection between the internal thread of a nut 2 and the external thread of a bolt, spindle or screw 1. In this embodiment, only one face of the internal thread has a self-locking portion composed of only two facets B and C. The angle beta between the facet B and the axis of the female component 2 is between 5° and 30°, preferably at least close to 13°. The crest 5 of the male thread is rounded in a manner as is customary in threaded connections. As indicated by broken lines, the flat facet B can be replaced with an arcuate (convex) facet which bolts toward the crest 5. The arcuate facet B can be bounded by a convex surface having a part circular cross-sectional outline, and the facet C extends tangentially of such outline with gradual transition into the convex facet B.

It is possible to replace the illustrated convex facet B with a facet having a paraboloidal or hyperboloidal cross-sectional outline.

An advantage of arcuate facets is that a deformed crest 5 or 6 is less likely to "slip back" when it frictionally engages an arcuate facet.

Figure 4:
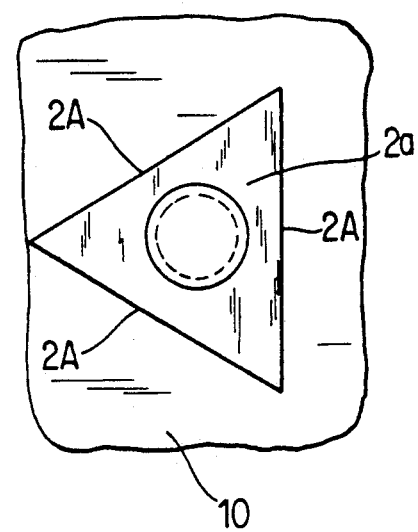
FIG. 4 is an end elevational view of a nut which can constitute female component of the improved threaded connection, the view being taken in the direction of arrow IV in FIG. 1.

An advantage of the nut 2a of FIG. 4 is that it is less likely to expand in the radial direction in response to axial stressing (and resulting self locking engagement of its thread 7a with the thread 7 of a bolt 1) than a nut the peripheral surface of which has pairs of parallel sections. In other words, the illustrated triangular nut 2a can offer greater resistance to radial expansion than a hexagonal nut having three pairs of parallel peripheral surface sections.

Figure 5:
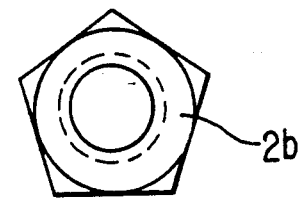
FIG. 5 is an end elevational view of a modified nut.

FIG. 5 shows a nut 2b having a pentagonal outline, i.e., its peripheral surface has five sections each of which is inclined relative to each other section. This nut exhibits the same advantage as the nut 2a of FIG. 4.

Figure 6:
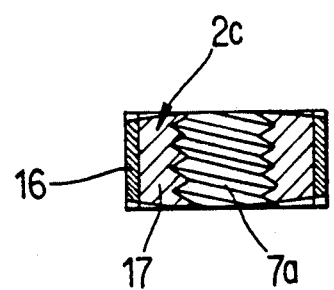
FIG. 6 is an axial sectional view of a composite nut.

FIG. 6 shows a nut 2c which includes a relatively soft (pliable) and relatively elastic inner portion 17 which surrounds the internal thread 7a, and an outer portion or envelope 16 which surrounds the inner portion 17 and is less elastic and less plastic than the inner portion. An advantage of the nut 2c is that its inner portion 17 can undergo necessary deformation in response to self-locking engagement with the external thread of a bolt or the like but the outer portion 16 reliably prevents undue radial expansion of the inner portion 17, i.e., the inner portion can remain in self-locking engagement with the shank of a bolt or screw. It has been found that a nut of the type shown in FIG. 6 permits the establishment of a highly satisfactory self-locking action which is superior to that of heretofore known threaded connections. Moreover, it is possible to achieve savings in the normally more expensive material which is used for the making of the outer portion 16. In other words, the entire nut 2c need not be made of a high-quality material. Still further, the nut 2c of FIG. 6 can compensate for considerable manufacturing tolerances due to relative elasticity and plasticity of its inner portion 17.

The outer portion 16 of the nut 2c can constitute a band which is convoluted around the inner portion 17 and the ends of which are welded to each other and/or to the adjacent part of the inner portion 17. The nut 2c can be modified by providing it with an elastic innermost portion, a less elastic intermediate portion which surrounds the innermost portion, and an even less elastic outer portion which surrounds the intermediate portion.

Pronounced radial expansion of the nut (female component) in response to the establishment of a self-locking action could adversely affect the self-locking action. As mentioned above, such self-locking action develops as a result of the application of an axially oriented stress which has a substantial component in the radial direction, i.e., this radial component tends to expand the female component of the threaded connection and to thus terminate or at least weaken the self-locking action.

The nuts which are shown in FIGS. 4, 5 and 6 have been found to be capable of standing pronounced radial or nearly radial forces which tend to expand the female component and to thus terminate, or at least unduly weaken, the self-locking action.

The improved self-locking connection can be used with advantage in many types of surgical and related instruments, for example, in those described and shown in the commonly owned copending patent application Ser. No. 07/629,996 for "Screw for use in osteosynthesis".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A self-locking threaded connection comprising a male component having an external screw thread and a female component having an at least substantially uniform internal screw thread, each of said threads having a central axis, a root, a crest and two faces flanking the root, said internal thread including a self-locking portion adjacent the respective root and having a plurality of mutually inclined facets, said portion of said at least one face being engaged by one face of said external thread in response to axial stressing of at least one of said components, said facets including a first facet which is inclined relative to the respective axis at a first angle of between 5° and 30°, and at least one additional facet adjacent said first facet and inclined relative to the respective axis at a second angle greater than said first angle.

2. The connection of claim 1, wherein said portion of said at least one face has three facets each inclined at a different angle relative to the respective axis.

3. The connection of claim 1, wherein said second angle is between 40° and 80°.

4. The connection of claim 1, wherein said first angle is between 8° and 15°.

5. The connection of claim 1, wherein said portion of said at least one face has two additional facets and said first facet is disposed between said additional facets.

6. The connection of claim 5, wherein at least one of said additional facets is at least substantially flat.

7. The connection of claim 1, wherein at least one of said facets has an arcuate cross-sectional outline.

8. The connection of claim 1, wherein said first facet is substantially flat.

9. The connection of claim 1 with said female component having a polygonal external surface including a plurality of sections each of which is inclined relative to each other section.

10. The connection of claim 9, wherein said external surface consists of three sections.

11. The connection of claim 9, wherein said external surface consists of five sections.

12. The connection of claim 1 with said male component having a first surface extending substantially radially outwardly from said external thread and said female component having a second surface confronting said first surface, at least one of said surfaces having a marginal portion more distant from the respective thread and an inner portion nearer to the respective thread and spacedly surrounded by said marginal portion, said marginal portion and said inner portion being offset relative to each other in the axial direction of the respective thread.

13. The connection of claim 12, wherein said at least one surface is a hollow conical surface.

14. The connection of claim 12, wherein said at least one surface is a concave surface.

* * * * *